(12) United States Patent
Pearl

(10) Patent No.: US 7,100,005 B2
(45) Date of Patent: Aug. 29, 2006

(54) RECORD STORAGE AND RETRIEVAL SOLUTION

(75) Inventor: Neil Pearl, El Dorado Hills, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 331 days.

(21) Appl. No.: 10/462,602

(22) Filed: Jun. 17, 2003

(65) Prior Publication Data

US 2004/0260893 A1    Dec. 23, 2004

(51) Int. Cl.
*G06F 12/00* (2006.01)

(52) U.S. Cl. .................. 711/161; 711/162; 707/101; 707/204

(58) Field of Classification Search .............. 707/1, 707/204, 200; 709/100, 221; 711/119, 122, 711/161, 162; 714/15; 705/34; 710/36
See application file for complete search history.

(56) References Cited

U.S. PATENT DOCUMENTS

| | | | | |
|---|---|---|---|---|
| 5,325,290 | A * | 6/1994 | Cauffman et al. | 705/34 |
| 6,618,728 | B1 * | 9/2003 | Rail | 707/101 |
| 6,959,300 | B1 * | 10/2005 | Caldwell et al. | 707/101 |
| 2001/0049712 | A1 * | 12/2001 | Leymann et al. | 709/100 |
| 2002/0143792 | A1 * | 10/2002 | Belu | 707/200 |
| 2003/0046313 | A1 * | 3/2003 | Leung et al. | 707/204 |
| 2003/0229613 | A1 * | 12/2003 | Zargham et al. | 707/1 |

OTHER PUBLICATIONS

Traffic Monitoring in a Network of PBXs; Sestak et al.; 1990.*
A Data-Warehouse / OLAP Framework for Scalable Telecommunicatio Tandem Traffic Analysis; Chen et al.*
Protection of Call Detail Records Data in Federal Telecommunications; Chokhani; The MITRE Corporation; 1990.*

* cited by examiner

*Primary Examiner*—Mano Padmanabhan
*Assistant Examiner*—Mardochee Chery

(57) ABSTRACT

An archival and restoration solution archiving a plurality of CDR files, selectively restoring the CDR files, and performing maintenance on archived CDR files, including purging archived CDR files that are older than a predetermined threshold age. The archival of the CDR files can be implemented with a particular naming convention to ease restoration of particular archived CDR files of all the CDR files archived. After restoration of particular archived CDR files, records within each restored archived CDR file can be searched for particular search criteria, and the result thereof output for a database, further archival, or for further review and analysis. The archival and restoration solution can be implemented by computer code controlling the archival, restoration, and maintenance in an autonomous manner based on a configuration file including operation parameters for the archival, restoration, and maintenance operations.

18 Claims, 4 Drawing Sheets

RECORD STORAGE AND RETRIEVAL SOLUTION

BACKGROUND OF THE INVENTION

1. Field of the Invention

The present invention relates to a record storage and retrieval solution. More particularly, the present invention relates to a Call Detail Records (CDR) storage and retrieval solution in a telecommunications network.

2. Description of the Related Art

In the telecommunications field, a necessary operation is the generation of records identifying information about a telecommunications operation between at least two points. For example, for billing purposes, it is typically necessary to know who initiated a telephone call and where that telephone call originated, who was in receipt of the telephone call, what telephone network the recipient was on, when the call occurred, and for how long, for example. In a wireless telecommunications area, all this information can be collated and used for current billing of each customer, as well as billing between networks. For example, based on the usage of a first network's customers of a second network's services the second network may bill the first network for that usage.

Again, using the wireless telecommunications example, during or after a wireless connection between at least two end users, information of that connection is generated and stored by one or more of the corresponding networks. For example, a Business Intelligence (BI) application extracts information from a network's signaling system to create Call Detail Records (CDRs), which provide information pertaining to the individual calls made on the network in one file. Further, in one example, a Call Detail Record (CDR) is opened when a call/transaction setup message is captured by the system and closed either when a release/disconnection message is detected or when a timeout expires. Every CDR may contain all the main parameters about the calls and/or the transactions. A single system can capture, analyze and deliver more than 500,000 calls/transactions per hour. Typically the call information is placed in flat (comma delimited text) records to form the CDRs, with each CDR record being stored in the system's memory, on the local hard disk and, optionally, delivered to a remote, centralized system called a CDR Server.

The aforementioned signaling system is typically a Signaling System 7 (SS7), which is merely a standard telecommunications protocol defined by the International Telecommunication Union (ITU) as a way to offload public switched telephone network (PSTN) data traffic congestion onto a wireless or wireline digital broadband network. In different areas of the world, differing signaling systems are implemented. Regardless, embodiments of the present invention are equally applicable.

SS7 is characterized by high-speed circuit switching and out-of-band signaling using Service Switching Points (SSPs), Signal Transfer Points (STPs), and Service Control Points (SCPs) (collectively referred to as signaling points, or SS7 nodes). Out-of-band signaling is signaling that does not take place over the same path as the data transfer (or conversation). A separate digital channel is created (called a signaling link), where messages are exchanged between network elements at 56 or 64 kilobit per second. These messages go back and forth setting up a call even before the recipient hears a dial tone. The messages help determine which route should be taken, whether the trunk route is free, and whether the recipient's phone is off the hook, for example. Although these messages are typically not included in the records of a CDR file, they are used to help build the CDR records.

Once CDRs have been generated and transported to a Data Management Component (DMC), or any data management system, a BI application can enhance the data using customer-supplied network reference data, and may enable the CDR data to be placed into a database, e.g., a relational database management system (RDBMS).

The BI application may summarize the call information in the form of daily network activity reports, which associate and quantify calls made through interconnected carriers. As noted above, these reports can be used by network and business managers to generate billing to customers or other networks. In addition, such reports can be used to make informed business decisions, since they can illustrate call volumes and network usage.

In addition, as noted above, the volume of the records stored in each CDR is traditionally extremely large. Thus, it is imperative to efficiently store (Compress/Archive) and retrieve selected CDR records (Restoration), and manage the accumulation (Archive Maintenance) of the CDRs, which store these individual records. Further, there is a need for a solution specifically for archiving literally terabytes of data. Typically, each record in a CDR may be 182 fields (in comma delimited text), amounting to around 2,000 bytes. In each CDR file there are tens of thousands of these records, potentially resulting in hundreds of thousands of records depending upon the size of the network.

If the CDR files are compressed, to conserve storage capacity, then there also is a need for a retrieval capacity for select CDR files and/or records from within that file. For example, there may be government regulations requiring such CDR files information to be stored for a period of time, e.g., 180 days, so such records could be used for tariff dispute resolution between networks, e.g., between wireless carriers. The tariff resolution may merely be one carrier questioning the billing statement presented to them from another carrier. The billing carrier may then need to decompress a large number of CDR files, and their corresponding records, to present the required proof for the billing. However, presently there is not an efficient solution for archiving and retrieving such CDR files. Large volumes of CDR files may need to be decompressed and then an extensive search of those files would be required, when the billing controversy was only concerning a select few records, e.g., records from a particular period of time or from or to a particular network.

Thus, the present invention overcomes the above problems in conventional systems by providing an efficient archival and retrieval solution for records.

SUMMARY OF THE INVENTION

Accordingly, the present invention provides an efficient record storage and retrieval solution.

Additional aspects of the invention will be set forth in part in the description which follows, and, in part, will be obvious from the description, or may be learned by practice of the invention.

An embodiment of the present invention provides an archival and restoration method, including automatically archiving a plurality of objects, selectively restoring at least less than all of the plurality of objects, and selectively performing an automated maintenance on archived objects of the plurality of archived objects.

The maintenance may include a purging of archived objects based upon an aspect of an archived object indicating that the archived object is of an age greater than a predetermined threshold age. Further, the threshold age may be 180 days, or any other predetermined threshold age.

In addition, the automation of the archiving and the maintenance may be controlled through a computer readable code. Further, the archiving, selective restoring, and maintenance may be automated based upon the computer readable code and at least one configuration file containing parameter information for each automated process. The objects may also be Call Detail Records (CDRs) from a telecommunication network.

The selectivity of the restoration may be based upon aspects of each archived object, including the name of the object, with the aspects of each archived object potentially including date and telecommunication carrier information in the name of the object.

The method may further include searching the selectively restored objects for objects including data matching a defined search criteria, and storing the objects including the matching data, separate from the selectively restored objects. The storing of the objects may include the matching data including storing the information in the objects to a database.

The archiving, selective restoring, and maintenance may be based upon at least the configuration file containing parameter information for each process. Further, there may be a single configuration file that includes instructions for a number of processors that are to be used to perform the archiving, selective restoring, and/or maintenance. The one configuration file may include instructions on sequential preferences for storage areas to be used for storing archived objects and/restored objects.

In addition, the archiving, selective restoration, and/or maintenance may be controllable through telnet, Internet, Intranet, or wireless communication, for example.

Further, the archiving, selective restoration, and/or maintenance may include logging of errors that occur during the archiving, selective restoration, and/or maintenance. The archival may also include compressing of each object.

Additional aspects of the present invention include embodiments of the present invention including a computer readable medium comprising a computer readable code controlling a controller to perform the above methods. Further aspects of the present invention include embodiments of the present invention include a controller including at least one CPU and a storage unit including computer readable code controlling the controller to similarly perform the above methods.

BRIEF DESCRIPTION OF THE DRAWINGS

The present invention will become more apparent and more readily appreciated from the following description of the various embodiments, taken in conjunction with the accompanying drawings in which.

DETAILED DESCRIPTION OF THE PREFERRED EMBODIMENTS

Figure 1:
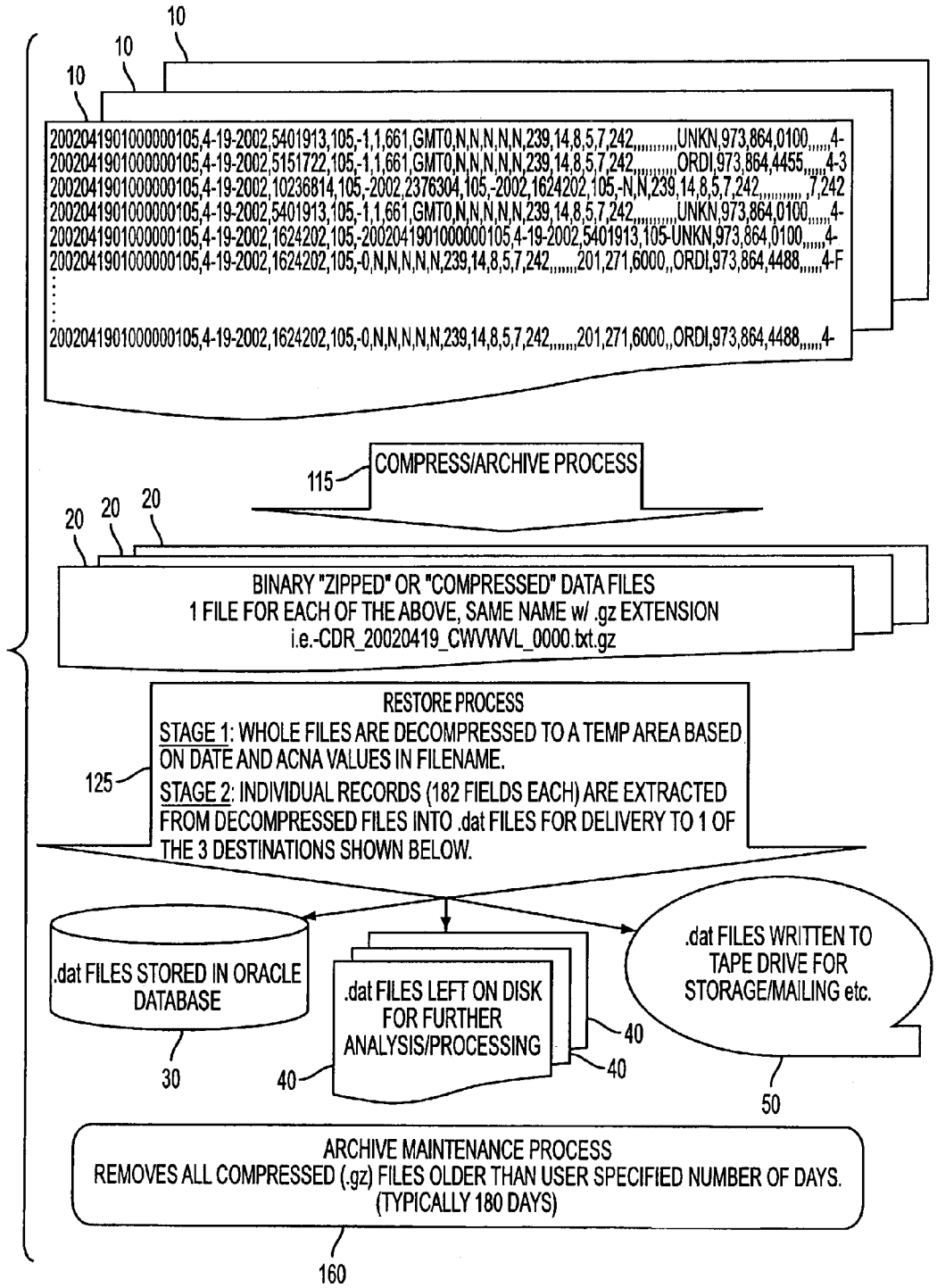
FIG. 1 is a schematic diagram illustrating three aspects of archiving CDR files, restoring CDR files, and performing maintenance on CDR files, according to an embodiment of the present invention.

Reference will now be made in detail to the embodiments of the present invention, examples of which are illustrated in the accompanying drawings, wherein like reference numerals refer to like elements throughout.

FIG. 1 illustrates a general overview of an embodiment of the present invention, including three aspects of archiving data, restoring archived data, and maintaining the archived data based on additional factors, such as the age of the data.

The above three aspects of archiving data, restoring archived data, and maintaining the archived data based on additional factors can be performed in separate or combined operations. In an embodiment of the present invention they are performed automatically based upon three separate Perl scripts (computer readable code). The operations could also be controlled through an interaction with a user, e.g., through a graphic user interface (GUI), or merely through a text interface. Similarly, such automatic operation or interactive control can also be implemented at an off-site terminal, e.g., through telnet, the Internet or an Intranet, or even through a wireless connection. Similarly, software controlling a computer to implement these operations may be stored on resident storage systems, e.g., a hard drive or networked RAID systems, or on a recording medium, easily moved from one system to the next and allowing for easy upgradability.

Figure 2:
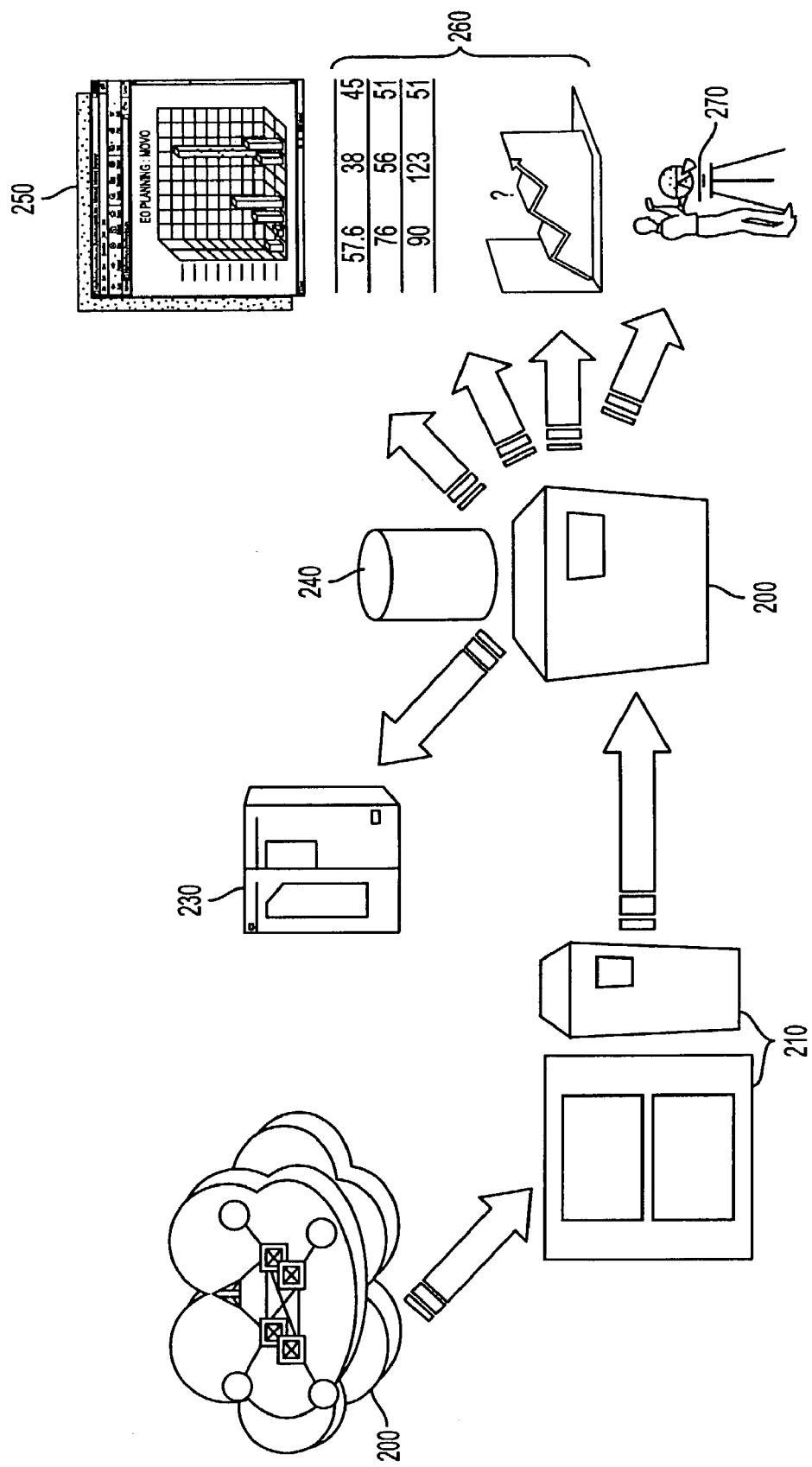
FIG. 2 is an illustration of a system level sequential process flow of information collection, CDR file creation, and CDR file archival, restoration, and maintenance, according to an embodiment of the present invention.

Typically, controllers that implement these herein referenced operations are multi-processor machines, since great computing power is often necessary to compress, decompress, search within the decompressed files, and purge unnecessary files. Such controllers can be computers or complete computer systems (whether on-site or off-site), or even controllable based upon computer readable media, enabling the operation of the aforementioned computer readable code. FIG. 2 illustrates a network and computer configuration implementing the present invention, including: collecting SS7 data from the network 200; generation of CDR files from the collected data using collection hardware 210; performing operations of the present invention at data management component (DMC) 220; outputting archived CDRs to tape archive 230; storing archived CDRs on the DMC in storage unit 240; and outputting restored CDR records to a graphical interface 250, a database system 260, or another storage unit for further analysis 270.

In FIG. 1, CDR files 10 are illustrated as including each call record on separate lines in the CDR file. The records have been specifically named according to the date of the call and the corresponding carrier. In this embodiment, CDR files 10 each contain hundreds of thousands of individual records, with 182 comma delimited fields each. The individual records may include additional information, including start date, end date, ACNA value (Access Carrier Name Abbreviation), calling state(s), called state(s), and direction of call (terminating, originating, or both), for example. The organization of these different types of information in each record is based on a preferred structure for each individual network, based upon their particular needs. The preferred structure could be stored in a configuration file, which may be set up upon installation or dynamically changed upon upgrading of standards or changed based upon the needs of the network. The configuration file may be used for additional preferential parameter information, such as the preferred file naming structure, where particular files are to be stored, how to handle errors in operation, how many processors should be designated to perform the required operations, or what type of compression to use (or was used) for archival of the CDR files.

FIG. 1 further illustrates Compress/Archive operation 115, which performs an archival of each CDR file. Compress/Archive operation 115 will now be further discussed in reference to FIG. 3.

Figure 3:
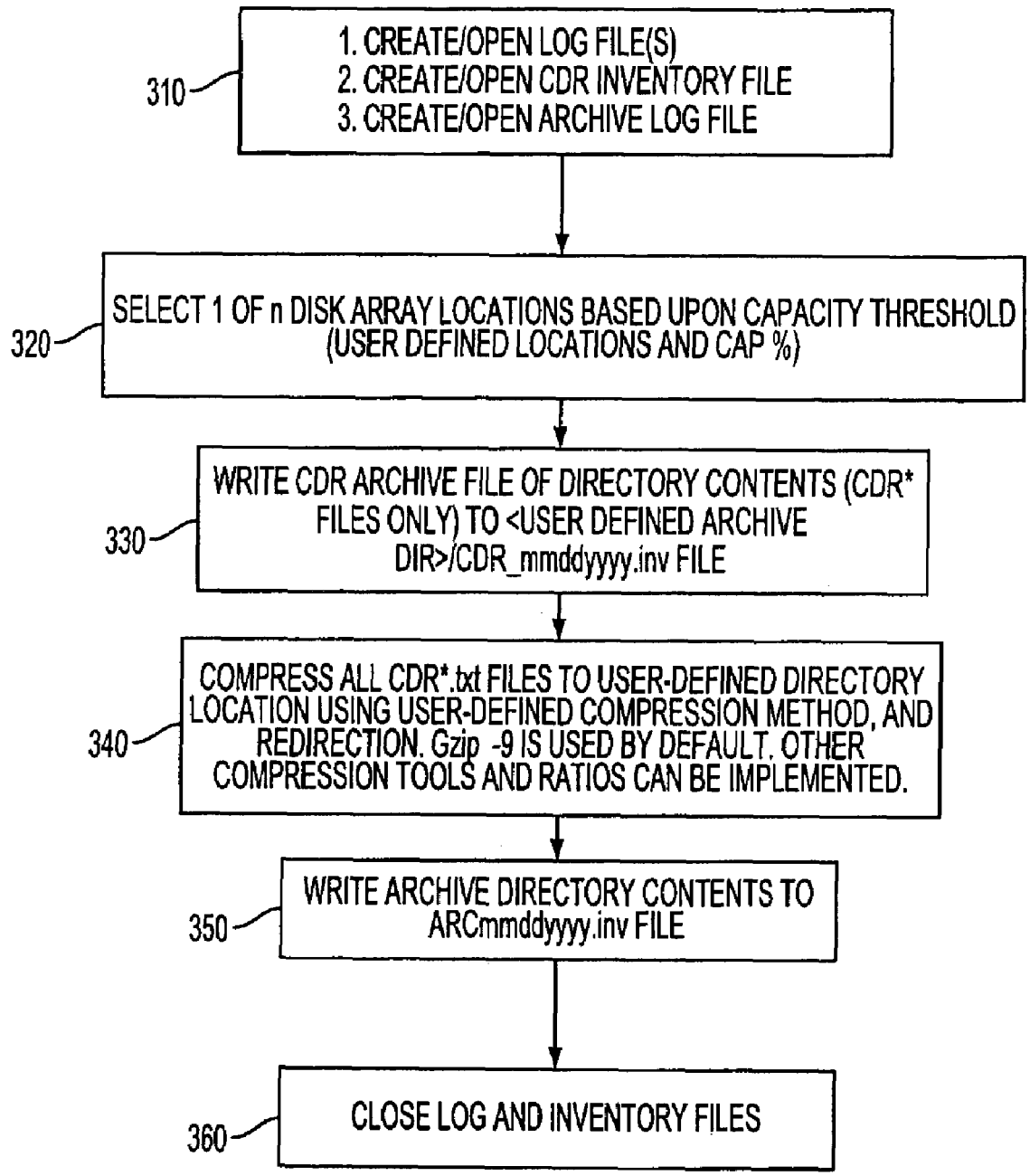
FIG. 3. is a flow chart describing an archival process of CDR files, according to an embodiment of the present invention.

FIG. 3 illustrates a flow chart for an archiving operation of each CDR. First, in operation 310, a log file, a CDR starting location inventory file (CDR_mmddyyyy.inv), and a Archival CDR end location inventory file (ARC_mmddyyyy.inv) are initially created and/or opened. The log file is a listing of which files were operated on. Basically like most software, this creates a written document that details what operations were performed. When files are being compressed and the compressed file is saved in a different location, the log file will indicate which files were compressed, where they were moved to, and whether it was successful or encountered a problem. If it is a severe problem, the system log will be notified, i.e., it's something the system administrator may need to know about.

The error handling function of the log file can more clearly explained as providing a full error handling and logging functionality. If the system encounters an error, it writes the error and information about the error to a sys log file, which is a common Unix utility which can alert the system administrator, depending upon the way a system administrator sets up the sys log file. An alert message can be sent to the screen of the system administrator, the error indication can be written a file that the system administrator checks every day, or the system administrator can be sent an e-mail, for example. Thus, basically the error handling aspect is merely just error logging. An error will typically be handled and logged, and the operations will continue on, if the error is not a critical error, e.g., the disc space being full or the disc physically damaged, at which time the system administrator is notified, as noted above.

Simple errors that would not entail notifying a system administrator might include an indication that a file was busy, and indication whether the operation can not be accomplished for lack of permission, or an indication that a file that met a search criteria couldn't be found, for example. The operations of the present invention can continue to operate if these errors occur.

The CDR starting location inventory file, in operation 310, is a listing of all the different files names that were acted upon and where they originally were. This information is helpful to an administrator so he can keep track of what files may have been removed in a purging operation, i.e., file information may be in the starting location inventory file but it may have been purged from the archival CDR files and no longer in the Archival CDR end location inventory file. The Archival CDR end location inventory file is essentially a listing of all the archived file names and actually where they were moved to. As noted above, during troubleshooting, it may be helpful to compare the CDR starting location inventory file and the Archival CDR end location inventory file.

In operation 320, of FIG. 3, storage unit locations are chosen for archival of the CDR files. A user can specify a particular storage unit to store the archived files, or the particular storage unit could be indicated in the configuration file. In addition, for example, if the specified storage unit exceeds its' capacity and becomes 95% full, for example, a user can specify, or the configuration file can indicate, a second storage unit to start storing archived information to, a third storage unit, a fourth storage unit, a fifth storage unit, a six storage unit, etc. In an embodiment of the present invention, the configuration file may have default entries for up to ten different disk locations. In another circumstance, a storage unit may be down for maintenance and it can't be written to, so the next storage unit is used.

In operation 330, of FIG. 3, the directory contents for CDR files are stored to the CDR end location inventory file (CDR_mmddyyyy.inv). Thereafter, in operation 340, each individual CDR (e.g., a text file) file is individually compressed and stored on a predefined location. The compression tools and ratios, and the predetermined location, can all be previously identified in the configuration file. After compression, the CDR files can also then be identified with a ".gz" end identifier, while the CDR had a ".txt" end identifier.

A standard compression utility for compressing files is gzip, which has an adjustable range between one and nine, with nine being the highest compression, requiring additional time and processing power. A one ratio would be quicker, but would not perform as good of a compression as the nine ratio. Typically, CDR files may be compressed about 60%.

In addition, since the compression of the CDR files includes such a large amount of information, the archiving of CDR files is typically stored on a particular storage unit that has fast reading and recording capabilities, and large capacities, e.g., a RAID 5 machine.

After the compression of the CDR files and the storage of the same to the particularized storage location, archival directory contents are written to the Archival CDR end location inventory file (ARCmmddyyyy.inv file), in operation 350, for example. Thereafter, the log file, the CDR starting location inventory file, and the Archival CDR end location inventory file are closed.

Upon completion of these operations, the CDR files are successfully archived. Referring to FIG. 1, archived CDR files 20, each correspond to one of CDR files 10. FIG. 1 further illustrates, according to an embodiment of the present invention, that each of archived CDR files 20 is stored in a particular format, e.g., "CDR_20020419_CWV-LWVL_0000txt.gz." The ".gz" extension signifies the file as being compressed.

In a Restore operation 125 of FIG. 1, the next aspect of the present invention is a selective decompression of archived CDR files, based on the date and ACNA (Access Carrier Name Abbreviation) values in their filenames. Individual records in each decompressed CDR file are selectively copied to .dat files for selective delivery to a relational database management system 30, storage of separate .dat files 40 in the storage unit for further analysis, or another storage unit 50, e.g., a tape drive, for storage or mailing, for example.

The selection of which compressed CDR files to decompress is based on whether the date and ACNA values in filenames of the compressed CDR files matching defined search parameters. For example, if a user indicated that they were only interested in records from three particular days and/or a particular network (carrier), then the compressed CDR files could be searched for matching filenames. The matching compressed CDR files could then be decompressed.

Once the matching compressed CDR files are located, they can be decompressed in a temporary memory or storage area, and additional searching would then be available. Since each record in each CDR has 182 fields, in an embodiment of the present invention, any of the information stored in any of the fields can be searched for matches, and the corresponding record can be stored and distributed as noted above. As also noted above, such data field information could include: start date information; end date information; ACNA values; calling state information; called state information; and direction of call (terminating, originating, or both). Since each of these fields is user definable, as typically stored in the configuration file, a search operation of the records is simplified to only have to look to a particular comma defined field for the particular field information.

Referring to FIG. 1, a third aspect of the present invention is the performance of archive maintenance operation 160 of the archived CDR files. As noted above, a period of time a network is required to store such CDR information may only be 180 days, after which time the information may be purged. The maintaining of the information for periods of time longer than necessary is merely burdensome on the network infrastructure. Therefore, an additional aspect of the present invention is the purging of compressed CDR information based on a search criteria. In an embodiment of the present invention, the search criteria is the date of the archived CDR file, which is stored in the filename, making the location of the files easy, i.e., all that is needed is the searching within the filenames of the archived CDR files. It is noted that additional or different search criteria could also be used. Further, additional operations other than purging could be implemented.

Figure 4:
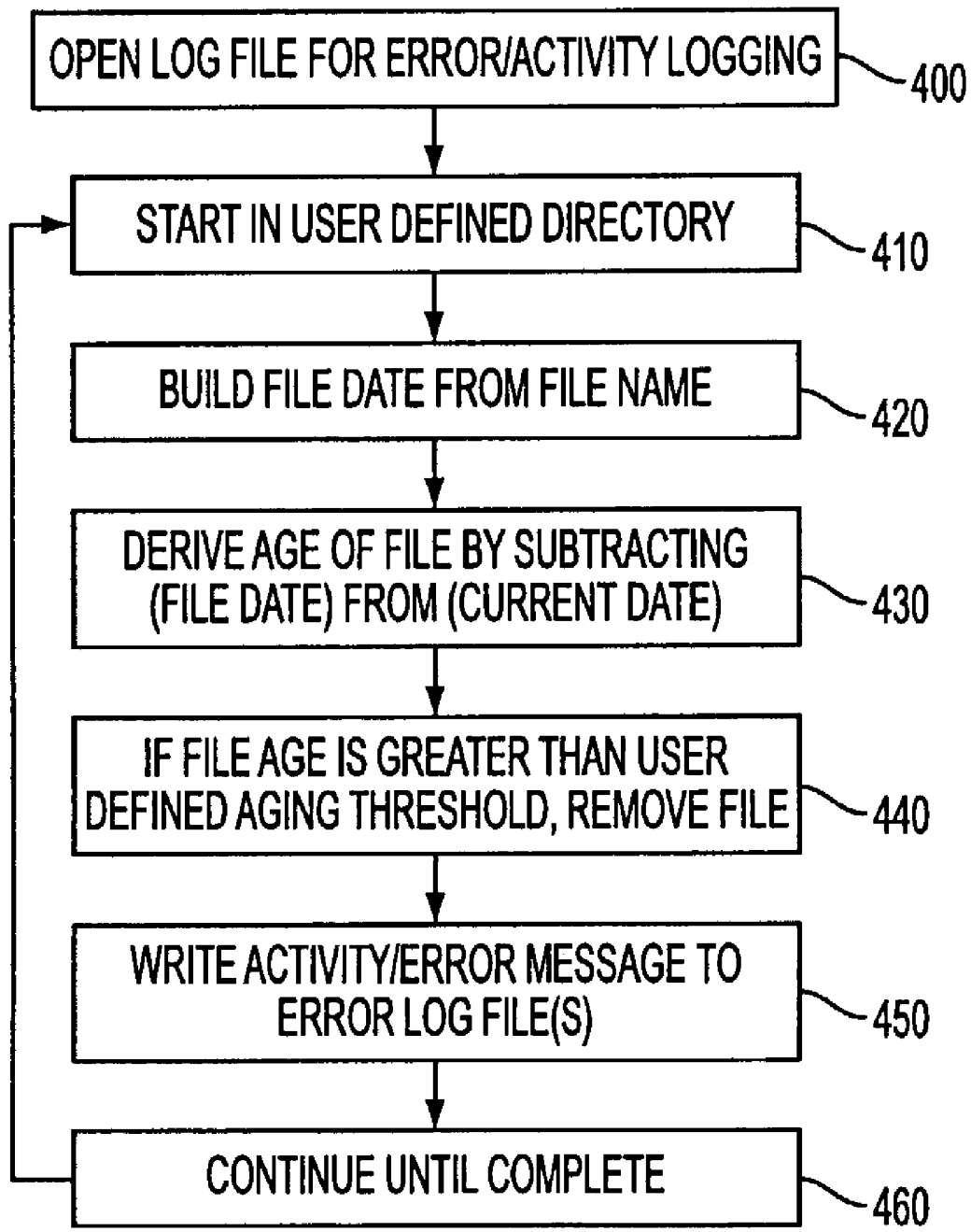
FIG. 4 is a flow chart describing an archival maintenance process of CDR files, according to an embodiment of the present invention.

FIG. 4 illustrates a flow chart for the operation of the archive maintenance operation 160, including: the opening of the aforementioned log file (or a new log file), in operation 400; the review of a user defined directory for compressed CDR files, in operation 410; the review of dates in filenames of compressed CDR files in the user defined directory, in operation 420; the derivation of the age of the compressed CDR files, in operation 430; removing compressed CDR files older than a threshold age (indicated in configuration file), in operation 440; writing to the log file of any simple or critical errors and which files deleted, in operation 450; and continuing this operation through all the compressed CDR filenames, in operation 460, until all have been reviewed. During the operation of the archive maintenance, or upon completion, an output could also be generated to display to a user the performed operations.

As noted above, the operations of the present invention can be implemented through the use of computer code, e.g., Perl scripts, and its interaction with a computer that potentially has multiple processors. Typically, since these aforementioned CDR related operations are quite taxing computational operations, many of the computer systems performing the operations may have upwards of 16, 32, or even 64 processors. In an embodiment of the present invention, Perl scripts could designate how many, or which, processors would be utilized to perform the aforementioned operations, typically based upon information in the configuration file. Typically, all but one processor may be allocated to perform these operations, leaving one processor to implement other necessary operations. Essentially, each processor can operate individually on different CDR files or Archived CDR files, either compressing, decompressing, searching, or even purging, separate from the operation of the other processors.

As noted above, multiple operations of the present invention revolve around what corresponding information is stored in a configuration file. However, the present invention is not limited thereto. Such information could be stored in alternate separate locations or requested from a user upon performance of such operations. In addition, as there are many differing CDR generating systems, each potentially arranging their data fields differently, the present invention may further include an operation of routinely reviewing CDR files for release versions, or other identifying information, and automatically obtaining an updated configuration file and/or notify a system administrator of the same.

Further, though the present invention has been associated with telecommunication systems, and more specifically CDR files, the present invention is not limited to this field. A component of the present invention is the use of a particular naming convention for names for compressed objects, e.g., CDR data files, to include at least two defining characteristics of that object. In an embodiment of the present invention, the two defining characteristics are date and carrier. Thus, any archiving operation could be implemented using this two defining characteristic approach, along with the other features of the present invention. In addition, a component of the present invention is to have an automated approach to archival maintenance, where code controls the archiving of objects, controls a searching of aspects of each archived object, e.g., a data file name date and carrier, to selectively restore some of the archived objects to enable additional search of the restored objects, and automatically performs archival maintenance on the archived files based upon an aspect of the object, e.g., purging data files based on the age of the archived data file. Lastly, although the term archiving had been illustrated as being equivalent to compression, alternative methods of archiving may be available, e.g., storing objects at off-site locations without compression.

Although preferred embodiments of the present invention have been shown and described, it will be appreciated by those skilled in the art that changes may be made in these embodiments without departing from the principle and spirit of the invention, the scope of which is defined in the appended claims and their equivalents.

What is claimed is:

1. A method, comprising:
   automatically archiving a plurality of Signal System 7 (SS7) Call Detail Records (CDRs) from a Signal System 7 (SS7) telecommunication network in accordance with a user-defined compression ratio, a log file, a CDR starting location inventory file and an archival CDR end of location file;
   selectively restoring less than all of the plurality of archived CDRs in accordance with a date range and an Access Carrier Name Abbreviation (ACNA) of said less than all of the plurality of archived CDRs; and
   selectively performing an automated maintenance on archived CDRs of the plurality of archived CDRs in accordance with the log file.

2. The method of claim 1, wherein the maintenance includes purging archived CDRs based upon an aspect of an archived CDR indicating that the archived CDRs to be purged are of an age greater than a predetermined threshold age.

3. The method of claim 2, wherein the threshold age is 180 days.

4. The method of claim 1, wherein the automation of the archiving and the maintenance is controlled through a computer readable code.

5. The method of claim 1, further comprising:
    searching the selectively restored CDRs for CDRs including data matching a defined search criteria; and
    storing the CDRs including the matching data, separate from the selectively restored CDRs.

6. The method of claim 1, wherein the archiving, selective restoration, and/or maintenance is controllable through telnet, Internet, Intranet, and/or wireless communication.

7. The method of claim 1, wherein the archiving, selective restoration, and/or maintenance includes logging errors that occur during the archiving, selective restoration, and/or maintenance.

8. A computer readable medium comprising a computer readable code controlling a controller to perform the method of claim 1.

9. A controller comprising at least one CPU and a storage unit including computer readable code controlling a controller to perform the method of claim 1.

10. A method as in claim 1, wherein said automatically archiving automatically archives the plurality of CDRs in accordance with a user-defined compression method, wherein the compression method and compression ratio are user-defined in a configuration file accessed by said automatically archiving.

11. A method as in claim 1, wherein said automatically archiving automatically archives the plurality of CDRs in accordance with user-defined archive destination locations.

12. A method as in claim 11, wherein the archive destination locations are user-defined in a configuration file accessed by said automatically archiving.

13. A method as in claim 1, wherein said automatically archiving automatically switches a storage capacity location for archival based on user-defined available capacity.

14. A method as in claim 13, wherein the available capacity is user-defined in a configuration file accessed by said automatically archiving.

15. A method as in claim 1, wherein
    said automatically archiving automatically archives the plurality of CDRs in accordance with a user-defined compression method and user-defined archive destination locations, and
    said automatically archiving automatically switches a storage capacity location for archival based on user-defined available capacity.

16. A method as in claim 15, wherein the compression method, the archive destination locations and the available capacity are user-defined in a configuration file accessed by said automatically archiving.

17. An apparatus comprising:
    means for automatically archiving a plurality of Signal System 7 (SS7) Call Detail Records (CDRs) from a Signal System 7 (SS7) telecommunication network in accordance with a user-defined compression ratio, a log file, a CDR starting location inventory file and an archival CDR end of location file;
    means for selectively restoring less than all of the plurality of archived CDRs in accordance with a date range and an Access Carrier Name Abbreviation (ACNA) of said less than all of the plurality of archived CDRs; and
    means for selectively performing an automated maintenance on archived CDRs of the plurality of archived CDRs in accordance with the log file.

18. A method comprising:
    automatically archiving a plurality of Signal System 7 (SS7) Call Detail Records (CDRs) from a Signal System 7 (SS7) telecommunication network in accordance with a log file, a CDR starting location inventory file, an archival CDR end of location file, a user-defined compression ratio, a user-defined compression method and user-defined archive destination locations, wherein
        said automatically archiving includes automatically switching a storage capacity location for archival based on user-defined available capacity, and
        the compression ratio, the compression method, the archive destination locations and the available capacity are user-defined in a configuration file accessed by said automatically archiving;
    selectively restoring less than all of the plurality of archived CDRs in accordance with an Access Carrier Name Abbreviation (ACNA), a date range, a call direction and a state of said less than all of the plurality of archived CDRs, to either of at least three different provided locations for storing the restored CDRs; and
    selectively performing an automated maintenance on archived CDRs of the plurality of archived CDRs in accordance with the log file.

* * * * *